United States Patent [19]

Bourne

[11] 4,286,462
[45] Sep. 1, 1981

[54] ACOUSTIC DETECTION OF WIND SPEED AND DIRECTION AT VARIOUS ALTITUDES

[75] Inventor: Ian A. Bourne, Nunawading, Australia

[73] Assignee: The University of Melbourne, Parkville, Australia

[21] Appl. No.: 68,331

[22] Filed: Aug. 21, 1979

[30] Foreign Application Priority Data

Aug. 22, 1978 [AU] Australia ............................ PD5604

[51] Int. Cl.³ ............................................. G01W 1/02
[52] U.S. Cl. ..................................................... 73/189
[58] Field of Search .................................. 73/189, 648

[56] References Cited

U.S. PATENT DOCUMENTS

| | | | |
|---|---|---|---|
| 3,889,533 | 6/1975 | Balser | 73/189 |
| 4,114,438 | 9/1978 | Muraz et al. | 73/189 X |
| 4,206,639 | 6/1980 | Balser | 73/189 |

FOREIGN PATENT DOCUMENTS

154065  8/1963  U.S.S.R. ................................... 73/189

OTHER PUBLICATIONS

Taylor, F. J. et al., Crosswind Measurements Through Pattern Recognition Techniques, IEEE Transactions, vol. GE-13 No. 4, pp. 175-182, Oct. 1975.

Primary Examiner—Jerry W. Myracle
Attorney, Agent, or Firm—Dennison, Meserole, Pollack & Scheiner

[57] ABSTRACT

An acoustic apparatus for ascertaining wind speed and direction at various altitudes which uses back scattered acoustic waves which are formed from acoustic pulses of predetermined frequencies, are transmitted on at least two planes and the frequency spectrum and power of back scattered signals are measured, the received signal is divided into a number of discrete frequency channels and these divided signals are used to provide a velocity indication at various altitudes at sequential time intervals.

14 Claims, 2 Drawing Figures

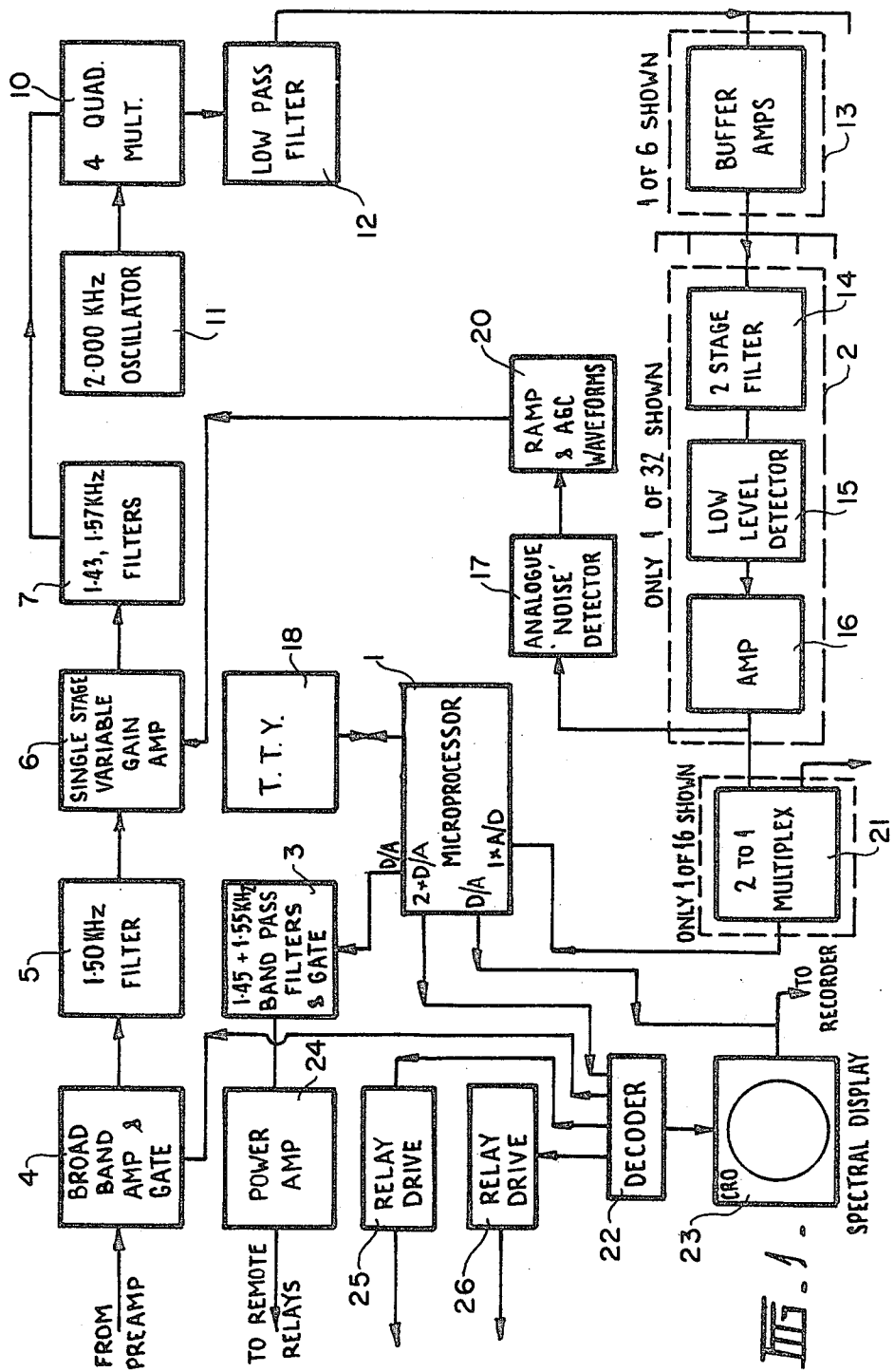

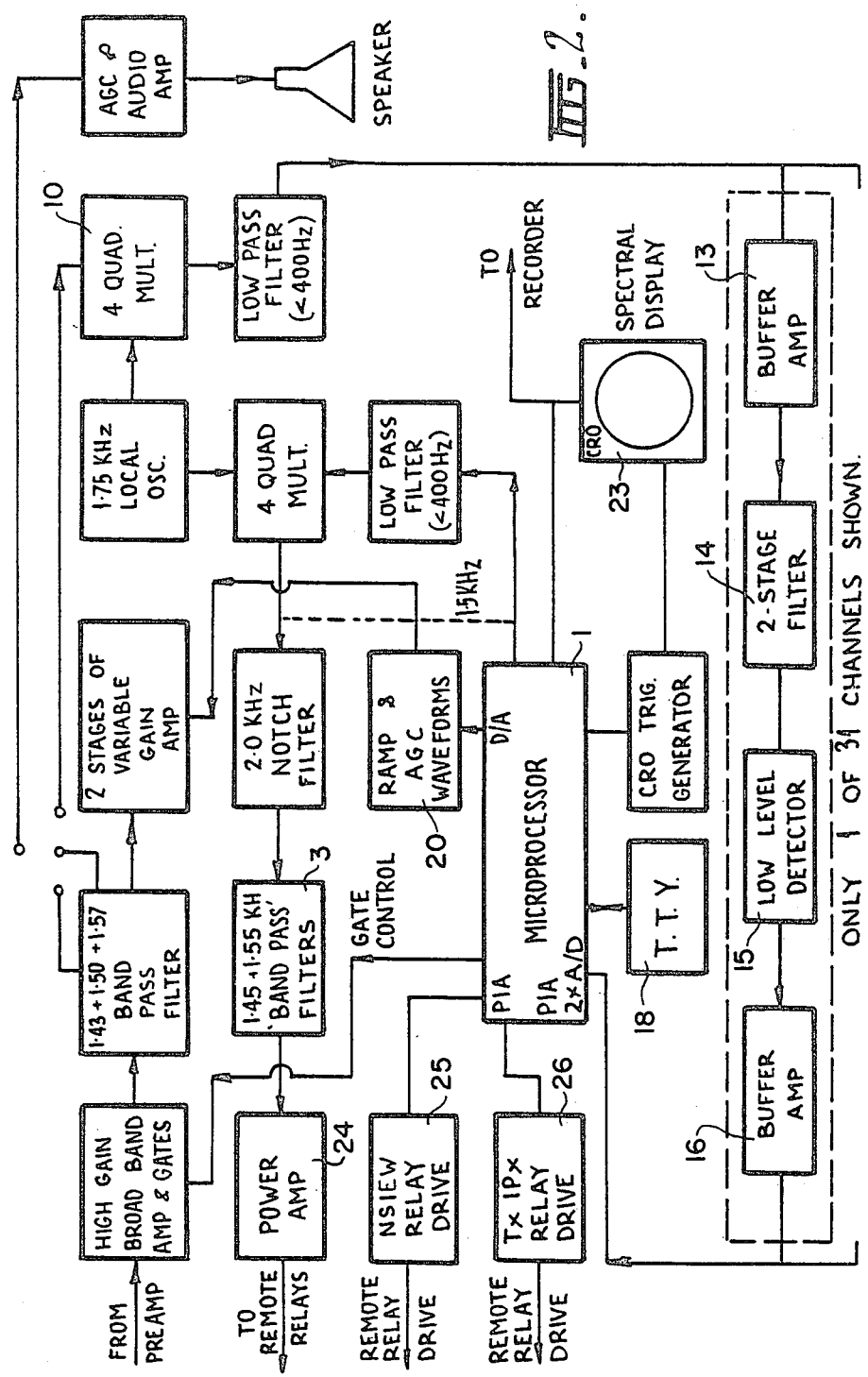

ACOUSTIC DETECTION OF WIND SPEED AND DIRECTION AT VARIOUS ALTITUDES

BACKGROUND OF THE INVENTION

1. Field of the Invention

This invention relates to apparatus for the acoustic detection of wind speed and direction at various altitudes.

2. Description of the Prior Art

Recently, for several reasons, there has been great interest in obtaining accurate estimations of variations in wind speed and direction at various altitudes and particularly systems which can give a continual and accurate reading of variations over relatively small discreet altitude variations over the first two or three thousand meters of altitude above ground.

Presently, there are several techniques which are available but these all suffer disadvantages.

The first is the use of instrumented towers. These can give a direct reading at whatever spacing is required but the towers need to be free standing so that their readings are not adversely effected by local buildings and, practically, it is difficult to use a tower to obtain readings for heights beyond 175 meters.

A second form is to track freely rising balloons. Such tracking is valuable where the situation up to very great heights is required. A good profile up to 30,000 meters can be obtained but the height resolution, of the order of 300 meters, is poor and, if a time resolution of a few minutes is required for extended periods, such a system can be prohibitively expensive.

It is also possible to use tethered kites, balloons or kitetoons but these have not been satisfactory for two reasons. Firstly if the system is tethered to more than a few hundred feet, they are hazardous to aircraft and the systems are, in any case difficult and expensive to operate and maintain over extended periods. Furthermore, kites are difficult to use in very light or very strong wind conditions and balloons and kitetoons are restricted to light or moderate wind conditions.

Because of recent developments and the necessity to maintain a close watch on wind speed at airports as landing speeds, particularly, are becoming critical, because there has been a great upsurge in interest in atmospheric pollution, and as there has been a deal of interest in wind power generating systems, a good knowledge of the wind parameters, particularly those at altitudes where aircraft can be at risk, where pollution will be held by an inversion and in selecting sites for wind power generating systems, the need for accurate and, preferably relatively portable, detectors of wind parameters are required.

For many years it has been known that the atmosphere can be remotely sensed by studying the back scattering or reflection of acoustic waves by irregularities in its temperature, humidity and velocity structures.

The interaction of the atmosphere with acoustic waves differs from that with electro-magnetic waves. Electro-magnetic waves are influenced by the temperature and humidity structures but this influence is very weak and difficult to detect, whereas it is possible to measure the strength of the back scattered signal from an acoustic wave, and hence the presence of small scale turbulance, with equipment which does not have to have the sensitivity or selectivity which would be necessary if an electro-magnetic wave was being studied.

Further, acoustic waves back scattered through 180° are scattered by turbulence in the temperature profile but are not influenced by turbulence in the velocity structure.

There are two available techniques whereby the required information could be ascertained. The first of these is a bistatic geometric arrangement in which waves scattered approximately 150° are observed so that the variations in the velocity structure contribute to the strength of the scattered signal and result in an improved signal to noise ratio. Two major disadvantages in bistatic systems are that they need very substantial land areas, if scattering up to an even moderate height is to be required, and the normal use of multiple receiving and/or transmitting antennae and the cabling requirements associated therewith make the system excessively expensive.

Also, if it is necessary to use a full spectral analysis the system has to be associated with a relatively complex computer and, again, costs are high.

SUMMARY OF THE INVENTION

It is an object of our invention to provide a monostatic system which can, if required, operate as a unit of a bistatic system but which is substantially cheaper than previously known arrangements.

It is a second object to provide apparatus which is sufficiently small to be readily, easily transportable and which can be set out at different positions with reasonable ease.

The invention in its broadest aspect includes apparatus for the detection of wind speed and direction at various altitudes, comprising means whereby an acoustic pulse of a predetermined frequency can be transmitted to the atmosphere on at least two planes, means being the or being associated with the transmitter transponder to receive and measure the received frequency spectrum and power, means whereby the received signal is passed through a comb filter whereby the received signal is divided into a number of discreet frequency channels, means whereby the signals from a particular altitude going through each channel are processed and means whereby from these processed signals an indication of wind speed and direction at any time at any of the preselected altitudes can be ascertained.

The predetermined frequency for transmission is selected to be sufficiently high to minimise the effect of spurious local noises but sufficiently low to minimize a large percentage of the power associated therewith from being absorbed into the atmosphere.

We have adopted to use the monostatic geometric arrangement which is very much smaller that the bistatic form to thereby help minimize siting requirements and cost and to improve the transportability of the system; however, the addition of two antenna systems can convert the unit into a bistatic system if required. A combination of analogue and digital techniques are used for system control but heavy reliance on digital techniques is used data processing. The basic design allows for unattended continuous operation or remote control of operational parameters and remote data display and provision has been made for a number of alternative data display formats.

An acoustic pulse is transmitted into the atmosphere at an angle 30° from the vertical. The transducer to propogate this pulse and the antenna used therewith may be conventional. Energy backscattered by temperature and humitity irregularities within 30 m layers of the atmosphere are received by the same antenna and the received frequency and power are measured. The mean power received from each 30 m height interval is dominantly a measure of the small scale turbulence in the temperature structure. Alternate pulses are transmitted in the NS and EW planes respectively and the doppler measurements enable the mean radial wind velocity along each of the antennae beams to be measured. By assuming that the mean vertical wind component is small this data enables the horizontal wind speed and direction to be calculated.

In order to ascertain the amplitude of the different frequencies several approaches could be taken. The most usual of these would be to do a full spectral analysis. Such analyses have been done by using Fast Fourier Transforms in digital computers. These analyses are satisfactory but need a large store and the cost was high. Alternatively there have been simple techniques proposed, such as zero crossing detectors and tracking filters but the performance of these was inadequate. As we believed that it would only be necessary to consider a relatively small range of doppler shifts if should be possible to use an analogue comb filter; such a filter appeared satisfactory provided it satisfied several requirements.

The first of these is that the filter had to be stable with respect to frequencies by the order of between 1:500 to 1:1000. It also needs a Q of the order of 1:100. Further, it has to maintain these qualities regardless of normal changes in temperature and line voltage. Further, the characteristics should be maintained with aging. We have found that by using IC gyrator circuits, which are simulated inductors, and employing certain high stability capacitors and resistors, the required qualities can be obtained. In order to complete the circuit, of which there are some eighty in the apparatus we provide two miniature potentiometers, one of which controls the center frequency and the other the band width of the gyrator.

Since reflections are caused by scattering from tubulence in the temperature profile the received amplitude is very variable and an average over a large number of samples must be used to establish the mean reflection properties. Provision has consequently been made to average data from up to 255 pulses. Furthermore, since other atmospherically propagated sounds generally determine the minimum signal that can be detected and since the interfering noise shows marked variations in amplitude and spectral characteristics with time, it is essential that data be processed to minimise the effect of spurious signals on the computed wind estimates. The choice of frequency is determined by a number of factors. The background noise due to wind and traffic decreases rapidly with increase in frequency. Also with increases in frequency, it is practical to make a highly directive antenna with good side lobe rejection. However, at frequencies above ~ 3KHz atmospheric absorption is sufficiently strong to restrict the useful range of the system, and the effects of other local noise sources, (in particular, birdsongs and insects such as crickets) become severe. Another important factor is the minimum wind velocity that it is desired to measure, since the doppler shift caused by wind at the scattering level is proportional to the transmitted frequency; consequently for a given required height resolution—and hence transmitted pulse duration—an increase in the transmitted frequency results in an increase in the minimum velocity that can be detected.

The optimum choice of system parameters is dependent on the proposed application of the unit. The parameters in Table 1 were chosen to obtain a height resolution of ~ 30 meters and to measure a minimum wind velocity component of 1 meter/sec; a first sample height is centred at 60 meters, and a maximum sample height at approximately 2000 meters.

TABLE 1

| | |
|---|---|
| Transmitted Frequency | 1.5KHz |
| Transmitted Pulse Length | 0.18 sec |
| Antenna Declination from Vertical | $30^0$ |
| Overall Bandwidths of Receiving System | 147 Hz |
| Spectral Resolution | 4.37 Hz |
| No. of Filters | 31 |
| Mean Power in pulse supplied to Acoustic Transducer | 100 w |
| Efficiency of Transducer | 20% |
| Antenna full beam width | $12^0$ |

The successful implementation of an acoustic wind finding system depends critically on the ability (1) to minimize the influence of interfering noise sources, (2) to disregard data badly contaminated by noise, (3) to reliably detect the scattered signal and to determine its doppler shift, (4) to process the data obtained from a number of samples to determine the representative mean value, (5) to assess the reliability of the wind velocity estimate and (6) to display the wind profile data in a form suited for the proposed application of the system. An implicit requirement is that an assessment of a systems capability and the cost of acquiring and operating the system must justify its proposed use.

We shall describe two embodiments of hybrid systems using both analogue and digital techniques with reference to the block diagrams of a detection and display system for wind speed and direction.

BRIEF DESCRIPTION OF THE DRAWINGS

FIG. 1 is a block diagram of the first embodiment of a detection and display system for wind speed and direction.

FIG. 2 is a block diagram of the second embodiment.

DESCRIPTION OF THE PREFERRED EMBODIMENTS

In the system of FIG. 1, the 8 bit microprocessor 1 (Motorola M6800) is used to generate a suitably modulated transmitting pulse, to control all timing operations, to sample the 31 channels of the comb spectrum analyser 2 and to determine if the spectral information meets a set of acceptance criteria. The generated transmitted pulse passes through a low pass filter or band pass filter 3 and a power amplifier before being switched to the dish-mounted transducer. After the transmitted, not shown pulse, the transducer is coupled to a sensitive low noise preamplifier, not shown and the received signals pass through a broad band amplifier 4, band pass filter 5 and a variable gain amplifier 6 which is used to both compensate for the expected decrease in intensity as a function of the range of the scattering volume and to act as an automatic gain control system with its gain dependent on the background noise level.

The filtered signal passed through filter 7 signal is then mixed in four quad multiplier 10 with a stable reference oscillator signal from oscillator 11 to generate an intermediate frequency (I.F.) of 500 hertz. The IF signal is coupled to low pass filter 12 and buffer amplifiers 13, and fed through a thirty-two element comb filter 2, only one channel of which is shown. Each filter has a band width of 4.37 Hz and stability of each filter's centre frequency and its Q, as previously discussed, are of prime importance. Each comb filter channel may include a two-stage filter 14, low level detector 15, and amplifier 16. The comb filter output is coupled by analogue noise detector 17 to ramp and a.g.c. waveform generator 20 for controlling variable gain amplifier 6. The thirty-two comb filter outputs are further multiplexed by two-to-one multiplexer 21 down to sixteen channels, and fed to microprocessor 1.

If the data from a particular level is accepted, the position of the dominant spectral peak is stored to generate a histogram of the occurrence of spectral peaks and the full spectrum is used to determine the average (power) spectrum of all the accepted echo returns from that level.

Data storage and program allocations require approximately 32,000 words of memory. In addition to the 16 channel A/D converter, a 4 channel D/A converter and an input to the Teleprinter (TTY) 18 are included. In this particular system, a dual Floppy Disk is also used for program manipulation and data storage if required.

If the transmitted frequency is at the centre of the frequency range covered by the bank of thirty-two filters, doppler shifts in the range of −71.25 to +71.25 Hz can be measured which correspond to horizontal wind velocities in the NS or EW directions of ±15 m/s. Provision is made so that the transmitted frequency can be manually or automatically offset to enable larger wind velocities to be measured. Independent offsets can be used for the pulses transmitted in the NS and EW planes allowing speeds up to 45 m/s to be measured.

Provision is made so that the operator may input from the TTY a range of program controls such as the number of times this program is to be repeated, the number of sample levels to be interrogated, the number of pulses to be transmitted within an observation period, the choice of one of a number of echo selection criteria, the use of automatic or manually controlled offset frequencies for the transmitted pulse, the choice of disk storage or printed copy of the computed wind values and the choice from a number of different types of data displays. The data may be displayed by coupling the microprocessor output via decoder 22 or directly to spectral display 23 or a recording device, not shown. Other outputs of the microprocessor may be coupled via band pass filter 3, power amplifier 24 and relay drives 25 and 26 for various control operations.

In addition, provision is made for up to 12 different programs to be inserted by the operator so that the system can sequentially work its way through the 12 programs and repeat the sequences a specified number of times. This provision is very valuable when the optimum choice of averaging period or type of display varies diurnally; for example, a time resolution of 30 minutes may be adequate and desirable for night-time operation but during periods when a sea breeze onset is likely, a time resolution of 5 minutes may be required.

The ability to produce data outputs in a form suited to the operational requirements of the system is of great importance. For example, an output required for data obtained over a 5 minute observation period and up to an altitude of 1000 m which provides detailed spectral information at 30 m intervals requires approximately 70 lines of printout. While this may be an admirable display for an isolated short term study, the sheer bulk of the material makes it difficult to readily appreciate or comprehend the meteorological significance of the results from that which would result from only 3 days operation (and require 400 m of TTY printout).

Alternatively, a single line display for each sampling period can be produced (at the expense of losing some potentially useful data), which can provide a dynamic and graphic display of events over the 3 day period using only 1 m of TTY printout.

To provide flexibility, a number of optimal outputs are available via the TTY either in real time or after storage in the Floppy Disk system. The most detailed display shows the average spectral data for all frequencies at all heights in a matrix form with superimposed symbols marking the average spectral peaks and the position of the most frequently observed frequency of the spectral peaks. In addition, a 'reliability' criteria code is associated with each level to give an indication of the reliability of the measured doppler shifts. Separate displays are available for the NS and EW antenna systems and these displays, in effect, contain plots of the NS and EW components of the wind velocity versus altitude.

A less detailed but more graphic display contains listings of the NS and EW components, the wind speed and, the wind direction and the reliability code as a function of altitude together with plots of the wind speed and wind direction versus altitude.

For many purposes, abbreviated 'summary' displays are most useful and economical, so provision has been made to choose one of 3 summary alternatives. The first of these alternatives requires approximately 4 lines of printout and provides a listing of the NS and EW components and their reliability criteria versus height, together with the appropriate offsets employed.

The other 2 displays show on a single line the sequence of numbers or symbols representing the wind direction and wind velocity. Wind directions are printed on the left side of the page and wind velocity on the right side and a sequence of such records enables contour plots of these parameters to be drawn with height and time being the axis coordinates.

The embodiment illustrated in FIG. 2 as compared to that to FIG. 1 illustrates changes in hardware technique and do not represent changes in the basic concepts employed in the methods of data acquisition and analysis. As such, no detailed description of the block diagram has been included herewith. However, those components which are similar to those of FIG. 1 have been accorded the same reference numerals.

The main factors that influenced the physical layout of this embodiment were as follows:

1. A decision to use the Omnibyte M6800 as the microprocessing system.

2. A desire to include the Omnibyte microprocessor and the analogue receiver and spectral analysis system within a single 19" rack.

3. A need to develop an operation system quickly but to retain provision to update the system, or to add additional features, at a later date.

4. The desire to reduce maintenance or service checks to a minimum.

5. The desirability of requiring a very limited stock of components for repairing or servicing a unit.

6. The need to be able to quickly and economically change the operation frequency of the system for specialized installations.

7. The need to simplify construction and adjustment procedures to minimise construction costs.

This embodiment differs from the first embodiment in the following manner:

1. The reduction of the intermediate frequency from 500 Hz to 250 Hz to reduce the effects of long term drift and the Q requirements required by the elements of the comb filter bank.

2. The generation of the transmitted tone burst can now be accomplished by mixing a 250 Hz tone (generated in the microprocessor) with a local oscillator set at 1750 Hz. This change greatly reduces the stability requirements of the local oscillator without degrading the accuracy of the wind velocity estimates; in fact, it is then possible to vary the local oscillator by 10% to choose the lowest noise receiving band of frequencies while introducing only a 10% error in any wind estimate.

2a. Alternatively, again, it is possible to directly generate a 1.5 KHz signal from the microprocessor and bypass the 1.75 KHz local oscillator.

3. Wherever possible, control signals from the microprocessor are brought out through a PIA. This has freed two D/A converters for other tasks.

4. Control of the gain of the receiving system is now shared between an analogue circuit and a D/A converter output from the microprocessor. An analogue ramp controls the gain at short ranges but a signal generated in the microprocessor can be used to limit (or adjust the gain once the ramp control exceeds a desired level.

5. Two A/D converters are now used to interface the 31 channel information available from the comb filter bank into the microprocessor's unit. This reduces the number of boards by 3.

6. The analogue rack now contains 13 boards of which all but one can be separated by ½" spacing. Since all boards are designed for the edge connectors used in the Omnibyte microprocessor system the complete unit can occupy one half of a full omnibyte rack while the Omnibyte microprocessor occupies the other hand of the rack.

7. To reduce construction time all board interconnections in the analogue unit are by a printed circuit back plane.

8. To facilitate changes in frequency all sections which need to be changed if the transmitter frequency is significantly altered are included on one board; consequently, a change of frequency can be acomplished by replacing only one board.

9. An audio amplifier with its own AGC has been included to drive an external loudspeaker. A choice of (hard wired ) options is available to allow a selection between two bandwidths and whether or not the microprocessor controlled AGC is effective in controlling the loudspeaker output.

10. With the exception of 9 transistors only 3 I.C. types are employed on the bands in the analogue rack, namely, a type MC 1494C which is an analogue 4 quadrant multiplier, a type LM 349 which is a quadrant operational amplifier, and one type LM 381 which is an audio amplifier. Tests have shown that the LM 349 operational amplifiers are at least as satisfactory as the LM 747 operational amplifiers used in the first embodiment.

11. An extra gain control stage has been included to increase the dynamic range of the system.

12. The provision of digital clock display and the ability to use the clock to determine at what times wind profiles are to be obtained.

13. The addition of the circuit boards which are required for a color TV display of the results.

14. The provision of interface boards to allow an output to be generated on a 7245A HP graphics plotter.

15. The use of a Teletype 43 teleprinter in place of the silent 700 TTY.

The physical layout of the boards is such that on looking at the front of the combined analogue and microprocessor rack, one sees:

1. The LHS of the rack occupied by the analogue system and the RHS occupied by the processor.

2. The audio signal generally enters from the LHS of the analogue rack and proceeds to the RHS. The interface between the analogue and microprocessor is via a flexible cable's intercommecting sockets on boards—these cables do not interfere with access to the bulk of the analogue boards or their test points.

The system of the present invention lends itself to wide modification and can also be used with a number of different output systems.

Firstly, the presently constructed system operates on only 100 watts transmitted power and increasing this directly increases returned signal amplitude. An increase in power factor of the order of four can be made using the same transducer and parabolic dish for both transmission and reception. When higher powers are required we would prefer to use a transmitting array and a single receiving dish. Such arrays can be constructed to have an input power of the order of 10 kW and a beam width of 2°, although, if such powerful units were used, it is likely that some shielding would be desirable to limit noise pollution. Arrays of this size would normally only be required for limited purposes where a maximum range of operation is necessary.

On the assumption that vertical wind velocity can be neglected, and as previously stated, this is small relative to horizontal velocity, by increasing the sensitivity of the system an improved time resolution can be obtained and that a North/South or East/West profile can be obtained from a single transmitted pulse. However, it must be borne in mind that whilst the average vertical component is relatively negligable, errors can occur unless the vertical component is measured directly and corrections made to the computed horizontal components. The time resolution can also be measured by simultaneously pulsing the N/S and E/W antenna systems and processing the data in parallel rather than alternate pulsing as presently employed. If vertical wind components are to be measured, and this can be most desirable as far as the pollution control aspect is concerned and as these are, generally, substantially less than the horizontal wind velocities, it is desirable to operate the system slightly differently than when measuring horizontal velocities. The modifications can be to use either a higher transmitting frequency, a longer transmitted pulse length or a spectrum analyser having a better frequency resolution than that described or a combination of these. This would add little extra cost to the system, necessitating only duplication of the analogue receiver and the spectrum analyser.

As indicated previously, the system of the invention permits a number of different forms of output. Specifically, we have developed a matrix display for use on a color television screen in which both the velocities and the direction of the wind at each sampling height at each time can be continuously displayed. We provide 128 points across the screen and scan so that the signal is changed each fourth line. We can program the microprocessor to provide 64 different colors but have found that approximately 20 colors are all that can be reasonably resolved, even with a colour reference and, thus, we have arranged to give direction, velocity and the echo amplitude in 12 or 16 colours around a spectrum, the direction simply being a direct function of colour and for velocity we use an approximately logarithmic scale so that the lower velocities are more clearly resolved than the higher velocities.

If required, a continuous time plot can be made of both speed and direction. This plot can be continually updated at predetermined intervals so that trends in speed or direction can be examined over a period. Alternatively, the display can simply be the last reading taken and can be updated at whatever frequency of reading is required.

Also, we can plot across the screen bar graphs showing the velocity or direction at various altitudes.

Another form of output we can use is a scanning ink recorder in which a pen moves continually above a moving chart and where required is moved downwardly into contact with the chart so that a profile plot can be obtained. If required, the time the pen remains on the paper or the intensity under which the pen is brought into contact with the paper can provide coding of the trace.

A similar recorder can be used with pressure sensitive paper by means of which, depending on the pen pressure, two or three different shades of grey can be displayed. By using a pressure sensitive paper, as recent reports state is now manufactured in Japan, a three color code hard copy display could be obtained.

We can also get hard copy from film in one of several ways. One is to simply photograph the display on the cathode ray tube of the television set and the second is to make a matrix of red, blue and green diodes and pulse these and photograph the diode array. A camera with a continuously moving film would then scan the diodes to produce a full display. This arrangement would be relatively expensive as there would have to be a line of 128 points, each of which has three diodes.

In a further different form we could use three diodes and cause these to sweep across in front of the lens. Again, the diodes could be located on a recorder of the type previously described and they could directly illuminate a color film moving along the recorder.

In a modified form of the invention we may use a monostatic 3-axis system where the first two axes can be considered to be the same as described previously herein and the third axis is vertically directed.

By using such an arrangement we find it possible to use the calculated vertical velocities at different altitudes which are, themselves, largely obtainable for the vertical axis signals to provide a correction to the horizontal velocities calculated along the two selected oblique axes.

It will be appreciated that because of the geometry of the system and considering the vertical as against the oblique paths, the accuracy of measurement of vertical velocities is higher than that of the horizontal velocities. (Theoretically, twice the velocity resolution is obtainable.).

Also, the effect of horizontal velocities on the pulses transmitted vertically are only slight and found to subsequently average out across the finite beam width of the vertical antenna, and so a basically accurate movement of vertical velocity can be ascertained from the vertical pulses.

This application may be particularly suitable for use in pollution control systems where a more complete monitoring of air movement may be desirable than, such as in normal airport applications, where horizontal wind movements are generally the most desirable information for flight patterns.

What is claimed is:

1. Apparatus for the detection of wind speed and direction at various altitudes, comprising:
   (a) means for transmitting to the atmosphere an acoustic pulse having a predetermined frequency spectrum;
   (b) means for receiving the energy of said pulse as scattered by the atmosphere to provide electrical signals;
   (c) means for comb filtering said electrical signals to divide said electrical signals into a number of discrete frequency channels;
   (d) means for generating a running mean of the output signal from each frequency channel; and means for substracting the mean from each output signal, whereby the influence of background noise and spurious signals is reduced;
   (e) means for rejecting the output signals from the discrete frequency channels which do not satisfy predetermined noise criteria;
   (f) means for determining the difference between the center frequencies of the transmitted pulse and the respective output signals from said discrete frequency channels which are not rejected to determine a velocity estimate of the wind in the direction of propagation; and
   (g) means for assessing the reliability of the estimated velocity, and means for rejecting those velocity estimates falling below a predetermined level of reliability.

2. Apparatus as claimed in claim 1, wherein said means for transmitting comprises means to transmit pulses in two planes; and
   means for summing vectorially the wind speed determined from each plane at each altitude to provide an indication of wind speed and direction at each altitude.

3. Apparatus as claimed in claim 1, further comprising means to transmit pulses in two planes and vertically;
   means for vectorially summing the wind speed determined from each plane at each altitude to provide the wind speed and direction at predetermined altitudes; and
   means responsive to the reflected pulse from the vertical to provide an indication of vertical wind speed.

4. Apparatus as claimed in claim 1, further comprising means responsive to the reflected pulse from the vertical and pulses from the other two planes to provide a correction to the horizontal velocity calculated from said other two planes.

5. Apparatus as claimed in claim 1, further comprising means for summing individual wind velocity estimates from a number of pulses to provide a histogram for indicating various wind velocities.

6. Apparatus as claimed in claim 5, further comprising means for measuring the width of said histogram;

means for measuring the width of an averaged spectra of said electrical signals; and means for measuring the difference between the mean doppler shift as determined from said averaged spectra and the most frequently observed doppler shift as determined from said histogram.

7. Apparatus as claimed in claim 6, further comprising means responsive to said measured widths to determine said reliability of said velocity estimate.

8. Apparatus as claimed in claim 7, further comprising means for displaying said velocity estimates and said reliability estimates.

9. Apparatus as claimed in claim 1, further comprising means for averaging the individual spectra of said electrical signals from a number of said pulses to provide a wind velocity estimate from the average spectra.

10. Apparatus as claimed in claim 1, further comprising means for changing the frequency of said acoustic pulse to enable the reflected signal to be detected by said comb filtering means.

11. Apparatus as claimed in claim 1, further comprising means for changing the operating frequency of said comb filtering means to enable the reflected signal to be detected by said comb filtering means.

12. Apparatus as claimed in claim 1, further comprising means for rejecting the individual spectra of said electrical signals when a spectrum contains two or more peaks of the same order of magnitude.

13. Apparatus as claimed in claim 1, further comprising means for rejecting an individual spectrum of said electrical signals when the position of the peak in said spectrum differs from the position of peaks at lower altitude levels by more than a predetermined frequency change.

14. Apparatus as claimed in claim 1, further comprising means for rejecting an individual spectrum of said electrical signals when the position of a peak in said spectrum differs from the position of previous peaks by more than a predetermined frequency change.

* * * * *